July 15, 1952
J. D. HISEY
2,603,356
PLATE FILTER
Filed Jan. 16, 1950
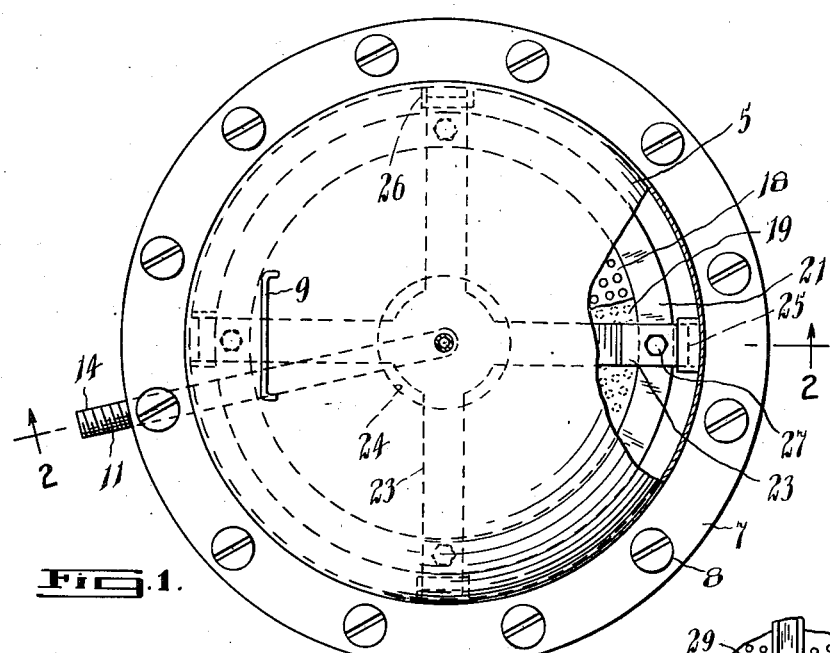
Fig. 1.
Fig. 4.
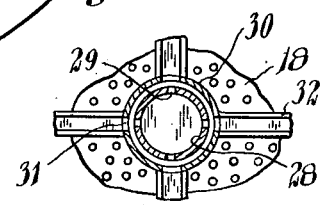
Fig. 3.
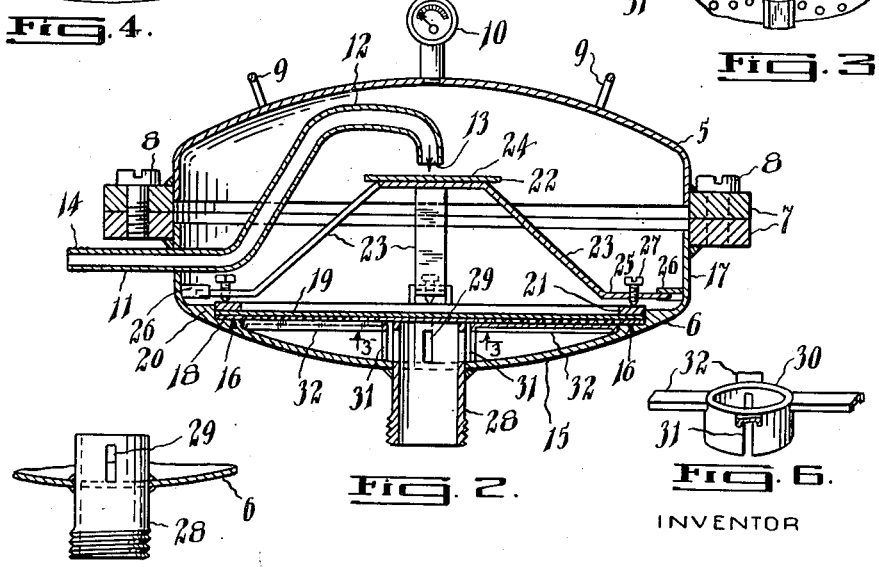
Fig. 2.
Fig. 6.
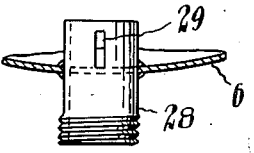
Fig. 5.
INVENTOR
JOHN DOUGLAS HISEY
By Frederick E. Bromley
ATTY.

Patented July 15, 1952

2,603,356

UNITED STATES PATENT OFFICE 2,603,356

PLATE FILTER

John Douglas Hisey, Toronto, Ontario, Canada

Application January 16, 1950, Serial No. 138,852

2 Claims. (Cl. 210—169)

My invention relates to filter devices of the plate type in which the filtering agent, such as a paper sheet, functions to filter fine particles from a liquid.

The general object of the invention is to provide a filter of this kind which is simple and inexpensive to construct, and which is facile of assembly and easy to clean.

A further object is to provide a filter which by virtue of its construction is well suited for use as a separate and distinct scavenger when coupled to another filter which may be of a conventional character and of a larger capacity having no provision for scavenging residue.

A further object is to produce an efficient and serviceable filter device constructed in a manner such that it can be readily disassembled.

With these and other objects in view the invention consists essentially in the novel construction and arrangement of parts as hereinafter clearly described with reference to the accompanying drawing.

In the drawing,

Fig. 1 is a plan view of a filter embodying the invention.

Fig. 2 is a section on line 2—2 of Fig. 1.

Fig. 3 is a section on line 3—3 of Fig. 2.

Fig. 4 is a detail of the clamp ring for the filter sheet.

Fig. 5 is a detail of the outlet portion of the case, and

Fig. 6 is a view in perspective of an auxiliary support for the perforated plate.

In carrying out the invention there is provided a case comprising two cup-shaped shells 5 and 6 preferably formed of pressed metal. Said cups are cylindrical members and each is provided with an external annular flange 7 at its mouth. The flanges are desirably rings welded to the side wall of the respective cups and pierced at intervals to receive fasteners, such as the headed screws 8, for which purpose the holes in one of the rings are tapped for threaded engagement with said screws. A liquid-tight joint is afforded by said flanges and screws by which said cups are sealed in assembly.

The upper cup 5 is supplied with handles 9 for convenience in lifting it off the lower cup and placing it thereon. The upper cup is also provided with a pressure gauge 10 as is customary in the art.

Liquid to be filtered is introduced into the case by a tube 11 which leads into the side wall of the lower cup 6 and is bent into a goose-neck 12 to rise into the upper cup 5 where it terminates in a centrally disposed orifice 13 for downward discharge of the liquid. The outer end 14 of said tube is threaded for making a connection with piping extending from the source of supply which is of course under pressure for performing the filtering operation.

The top wall of the upper cup and the bottom wall of the lower cup are dished. The bottom 15 of said lower cup is provided with an integral seat 16 which is circular and disposed at the side wall 17 but spaced therefrom. The perforated plate 18 for the filter sheet 19 is supported by said seat and concentrically retained against edgewise displacement by means of a circumscribing shoulder 20 which rises from said seat. Said filter sheet is an ordinary filter paper, but other approved materials could be used as a filter agent.

The means employed to secure the filter paper in place comprises a metal ring 21 placed thereon concentric with the seat 16 to clamp the paper marginally by pressure supplied by a spider clamp. The spider clamp comprises a spider 22 having radial arms 23 diverging from a dish-like hub 24. The hub is elevated with regard to the filter paper and is centrally disposed slightly below the inlet orifice 13 so as to act as a deflector or distribution plate for diffusion and distribution of the incoming liquid upon the filter paper to promote the filtering action. The arms 23 are bent downwardly and outwardly and are further bent at their end portions to provide end parts 25 which extend outwardly to engage under lugs 26. The end elements 25 carry screws 27 which are tightened against the ring 21. Accordingly, this arrangement not only applies clamping pressure upon the ring 21 but also retains the spider in place and enables it to be easily assembled and disassembled for replacement of the filter paper and for cleaning the apparatus.

The bottom wall 15 is supplied with a central egress in the form of a tube 28 which extends through this wall and is desirably welded to it. Tube 28 has its outer end threaded to connect with a pipe (not shown) for conducting filtered liquid to a receiver. The inner end of the tube extends upwardly to the perforated plate 18 to form an abutment for central support thereof. Slots 29 are cut in the wall of said inner end to form ports through which filtered liquid flows into the tube.

The unfiltered liquid exerts considerable pressure upon the perforated plate 18 and therefore it has been found necessary to adequately support it particularly as this plate is of thin sheet stock. To aid in supporting this plate there is provided an auxiliary support. The auxiliary support comprises a tubular sleeve 30 loosely encircling the inner end of the outlet tube 28 and seated on the bottom wall 15 of the case. Said sleeve is supplied with slots 31 or other openings in its wall through which filtered liquid passes to the outlet tube. A plurality of radial bars 32 are carried by the sleeve in supporting contact with the bottom face of the perforated plate 18. Said bars are preferably of a channel shape in cross section and their outer ends rest upon the bottom wall 15. This structure adequately supports the perforated plate and the auxiliary support is capable of being easily removed for cleaning purposes upon removal of the perforated plate.

The invention provides a desirable and efficient filter device for separation of solids from liquids and will be found to be efficacious where the percentage of solids is high. It is especially useful for general industrial experimental work because of the ease with which it can be opened and reset. The clamping spider with its distribution plate functions to direct the flow of incoming liquid uniformly over the filtering surface so that there is little likelihood of a "break-through" from cake-erosion.

An important feature of the filter device is that it is particularly adapted for use as a scavenger for a separate and distinct filter of a larger capacity to which it may be coupled and valve controlled. In its use as an external scavenger for another filter it can be operated and controlled independently thereof. Moreover it can be cleaned independently without affecting operation of the other filter, which permits flexibility of control of operation and has the advantage that it may be shut off from the other filter during the main part of a run and used for another purpose during the interval, which effects a saving in production time. The filter of the present invention may be made of sufficient capacity such that even the largest filter tank may have its hold-over completely filtered at a single operation. The advantages and utility of the invention will be appreciated from the preceding description and it is to be understood that details of construction may be modified without departing from the spirit of the invention.

What I claim is:

1. A filtering device comprising a closed case including a lower cup having a top opening and having a circular seat internally disposed adjacent to its side wall portion and spaced below the open top, said lower cup having a central outlet below said seat, a perforated plate marginally resting upon said seat for support of a filter paper, a retaining ring overlying said perforated plate to marginally clamp said filter paper, circumferentially spaced lugs projecting inwardly from said side wall portion of the lower cup at a point above said ring and terminated short thereof to provide clearance for removal of the ring through the open top of the lower cup, a spider having radial arms engaged under said lugs, clamp screws on said arms for applying clamping pressure on said ring, said spider also having a central distribution plate for incoming liquid, said distribution plate being carried by said arms and said arms being bent upwardly and inwardly from their outer ends to support said distribution plate in elevated position with respect to said lugs, and an intake pipe extending inwardly through the side wall portion of said lower cup and being bent upwardly above said distribution plate with a down turned outlet for discharge thereon.

2. A filtering device comprising a pair of similar cups having means at their open ends by which they are detachably connected together to form a closed case, one of said cups being invertedly disposed and constituting a top member of the case, the other cup having a circular seat internally disposed adjacent to its side wall portion and spaced below its open top, said other cup constituting a bottom member and having a central outlet below said seat, a perforated plate marginally resting upon said seat for support of a filter paper, a retaining ring overlying said perforated plate to marginally clamp said filter paper, circumferentially spaced lugs projecting inwardly from said side wall portion of the lower cup at a point above said ring and terminated short thereof to provide clearance for removal of the ring through the open top of the lower cup, a spider having radial arms engaged under said lugs, clamp screws on said arms for applying clamping pressure on said ring, said spider also having a central distribution plate for incoming liquid, said distribution plate being carried by said arms and said arms being bent upwardly and inwardly from their outer ends to support said distribution plate in elevated position with respect to said lugs, and an intake pipe extending inwardly through the side wall portion of said lower cup and being bent upwardly above said distribution plate with a down turned outlet for discharge thereon.

JOHN DOUGLAS HISEY.

REFERENCES CITED

The following references are of record in the file of this patent:

UNITED STATES PATENTS

| Number | Name | Date |
|---|---|---|
| 794,271 | Anson | July 11, 1905 |
| 1,190,841 | Almasy et al. | July 11, 1916 |
| 2,019,181 | Franzmeier | Oct. 29, 1935 |

FOREIGN PATENTS

| Number | Country | Date |
|---|---|---|
| 728,598 | France | July 7, 1932 |